United States Patent [19]
Andersson et al.

[11] Patent Number: 5,671,249
[45] Date of Patent: Sep. 23, 1997

[54] INTER-REPEATER BACKPLANE WITH SYNCHRONOUS/ASYNCHRONOUS DUAL MODE OPERATION

[75] Inventors: Ralph E. Andersson, Grass Valley; Joseph E. Heideman, Orangevale; David T. Chan, Fair Oaks; Haim Shafir, Sacramento, all of Calif.

[73] Assignee: Level One Communications, Inc., Sacramento, Calif.

[21] Appl. No.: 757,484

[22] Filed: Nov. 27, 1996

Related U.S. Application Data

[63] Continuation of Ser. No. 379,907, Jan. 30, 1995, abandoned.

[51] Int. Cl.$^6$ .......................... H04L 12/46; H04L 12/66; H04B 3/36
[52] U.S. Cl. .......................... 375/211; 375/286; 375/370; 370/402; 370/410; 370/445; 370/501; 370/825.14; 370/825.2
[58] Field of Search .................................. 375/211, 213, 375/214, 212, 354, 356, 369, 219, 368, 371, 370, 362; 455/7, 18; 178/70 R; 359/174, 176, 177, 178; 370/279, 293, 492, 501, 402, 410, 445, 438, 437; 340/825.03, 826, 825.06, 825.14, 825.2

[56] References Cited

U.S. PATENT DOCUMENTS

| | | |
|---|---|---|
| 4,063,220 | 12/1977 | Metcalfe et al. . |
| 4,099,024 | 7/1978 | Boggs et al. . |
| 4,284,843 | 8/1981 | White .................... 178/69 G |
| 4,367,549 | 1/1983 | Vachee .................... 370/91 |
| 4,608,685 | 8/1986 | Tain et al. .................... 370/85.8 |
| 5,396,495 | 3/1995 | Moorwood et al. .................... 370/85.11 |

OTHER PUBLICATIONS

Stallings, Digital Communications, 1994 pp. 436–450.
Baker, Data Communications, 24 Jan. 94, pp. 12–17.
AT&T Microelectronics, *T7202 Smart Hub Controller (SHC)*, Preliminary Data Sheet, Sep. 1992, entire document.

AT&T *T7201 Multi–Port Repeater Unit (MPR2)*, Preliminary Data Sheet, Jun. 1990, entire document.

Micro Linear, *10BASE–T Transceiver for Multi–Port Repeaters*, Advance Information, Sep. 1989, pp. 1–10.

Advanced Micro Devices, Am79C981 Integrated Multiport Repeater Plus™ (IMR+™), Preliminary, Feb. 1993, entire document.

National Semiconductor, *DP83950A Repeater Interface Controller (RIC)*, Preliminary, Sep. 1991, entire document.

National Semiconductor, *DP83950A/DP83956 LitE End Repeater Interface Controller (LERIC™)*, Preliminary, May 1992, entire document.

AT&T, *T7240 Twisted–Pair Port Transceiver (TPORT) Issue 2*, Advance Data Sheet (DRAFT), 1989, entire document.

*Primary Examiner*—Wellington Chin
*Assistant Examiner*—William Luther
*Attorney, Agent, or Firm*—Merchant, Gould, Smith, Edell, Welter & Schmidt, P.A.

[57] ABSTRACT

An inter-repeater backplane that may operate in either a synchronous or asynchronous mode for data transmission. The inter-repeater backplane includes a bus of electrical signal conductors coupled between repeaters for communicating electrical signals and data transmission mode detector for determining whether to transmit data synchronously or asynchronously. Data is recovered from a received data packet and is reframed for transmission across the inter-repeater backplane. According to which mode of data transmission is selected, the data is then retimed and transmitted across the backplane. In the synchronous mode of data transmission, the data is synchronized with the system clock. When the asynchronous mode of data transmission is selected, the data is transmitted asynchronously with respect to the system clock. In the asynchronous mode, the recovered data is timed with a clock signal associated with the transmitting repeater.

12 Claims, 6 Drawing Sheets

* COLLISION DEFINED AS A PORT THAT RECEIVES AND TRANSMITS AT THE SAME TIME.

REPEATER STATE DIAGRAM

* THIS CONDITION INDICATES ANOTHER REPEATER ON THE BACKPLANE IS RECEIVING

BACKPLANE STATE DIAGRAM

INTER-REPEATER BACKPLANE WITH SYNCHRONOUS/ASYNCHRONOUS DUAL MODE OPERATION

CROSS-REFERENCE TO RELATED APPLICATIONS

This is a continuation of application Ser. No. 08/379,907, filed Jan. 30, 1995 now abandoned.

This application is related to:

Application Ser. No. 08/379,903, entitled "Inter-Repeater Backplane With Mixed Signal State Machine Interconnect," filed on same date herewith by R. Andersson et al., and assigned to the assignee of this application;

Application Ser. No. 08/380,651, entitled "Inter-Repeater Backplane," filed on same date herewith by D. Chan et al., and assigned to the assignee of this application; and Application Ser. No. 08/380,074, entitled "Inter-Repeater Backplane For Allowing Hot-Swapping of Individual Repeater Circuits," filed on same date herewith by D. Chan et al., and assigned to the assignee of this application.

All of the above-identified applications are incorporated by reference herein.

BACKGROUND OF THE INVENTION

1. Field of the Invention

This invention relates in general to a dual mode inter-repeater backplane, and more particularly, to an inter-repeater backplane that employs either a synchronous or an asynchronous mode to convey data to adjacent repeaters across the backplane.

2. Description of Related Art

The communications industry has experienced phenomenal growth over the past several years. Much of this growth has occurred in the area of telecommunications involving computers and computer generated or stored data. The exchange of messages and data has been facilitated by the advent of local and metropolitan area networks. Remotely located computer users communicate over the local and metropolitan area networks to access data and to communicate with other remote computer users.

In such networks, nodes are connected to a bus and have multiple, or concurrent access to the communications medium. Typically, unshielded twisted pair cables or existing telephone wiring is used as the transmission medium to provide an economical solution to networking. However, the attenuation of signals transmitted over unshielded twisted pair cables increases as the distance between data terminal equipment becomes greater. Thus, repeaters are inserted in the twisted pair cables to facilitate greater distances.

The standard for Local and Metropolitan Area Network technologies is governed by IEEE Std. 802–1991. IEEE Std. 802–1991 describes the relationship among the family of 802 standards and their relationship to the ISO Open System Interconnection Basic Reference Model and is herein incorporated by reference. IEEE Std. 802.3–1991 defines the standards for a bus utilizing collision sense multiple access/ collision detection (CSMA/CD) as a data link access method and is herein also incorporated by reference.

The transmission of data with a repeater system may be accomplished either synchronously or asynchronously.

Repeaters have previously operated in either the synchronous or asynchronous mode but not both. For example, Advanced Micro Devices' Am79C981 sends data over the backplane synchronous to the master clock of the Am79C981. Similarly, the AT&T T7201 Multi-port Repeater in combination with the At&T T7202 Smart Hub Controller sends data over the backplane synchronous to the master clock of the chip.

In contrast, National Semiconductor's DP83950A Repeater Interface Controller and the DP83955/DP83956 Lite End Repeater Interface Controller devices (RIC and LERIC respectively) operate in the asynchronous mode when communicating over the backplane. In asynchronous mode the recovered clock is used to clock data to adjacent chips. The asynchronous character of the data transmission derives from the fact that the recovered clock is asynchronous to the system or local clock and therefore requires some form of timing instructions distinct from the system clock. There is a need, therefore, for a backplane which facilitates both synchronous and asynchronous modes.

SUMMARY OF THE INVENTION

To overcome the limitations in the prior art described above, and to overcome other limitations that will become apparent upon reading and understanding the present specification, the present invention discloses an inter-repeater backplane that employs either a synchronous or an asynchronous mode to convey data to adjacent repeaters across a backplane.

The present invention solves the above-described problems by providing an inter-repeater backplane which allows repeaters to be connected together into a single hub with each repeater capable of transmitting data either synchronously or asynchronously.

A system in accordance with the principles of the present invention includes a bus of electrical signal conductors for communicating electrical signals between a plurality of repeaters, a clock coupled to the bus for providing timing signals for transmitting data over the bus, transmission mode selection means, data recovery means, means for transmitting the data synchronously in response to the synchronous mode of data transmission being selected and means for transmitting the data asynchronously in response to the asynchronous mode being selected.

One aspect of the inter-repeater backplane is that the user is allowed to select either the synchronous or the asynchronous modes of operation. In synchronous mode, a system and backplane clock are used for all of the repeaters in the hub. Data passing across the backplane is synchronous to these two clocks. A common external source provides both the backplane clock and the system clock to all repeaters. The backplane clock must be synchronous with the system clock. The received data is retimed to the system clock using a receive side FIFO. Both the backplane clock and the retimed data are transmitted over the backplane. Other repeaters on the backplane then repeat the data received over the backplane without additional retiming.

In asynchronous mode an external backplane clock is not required. The repeaters run independently until one takes control of the inter-repeater backplane. A master clock is provided and the repeater receiving the data packet recovers the data via its timing recovery circuitry. The data and the recovered clock are then passed onto the backplane. Each repeater regenerates the preamble on the transmit path, and upon detection of start of frame retimes the backplane data and clocks the data out with its internal clock to each of its ports. All other repeaters synchronize to that clock using a transmit side FIFO for the duration of the transmission.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an inter-repeater backplane interconnecting multiple repeaters into a single hub wherein data may be transmitted between the repeaters associated with the hub either synchronously or asynchronously.

Figure 1:
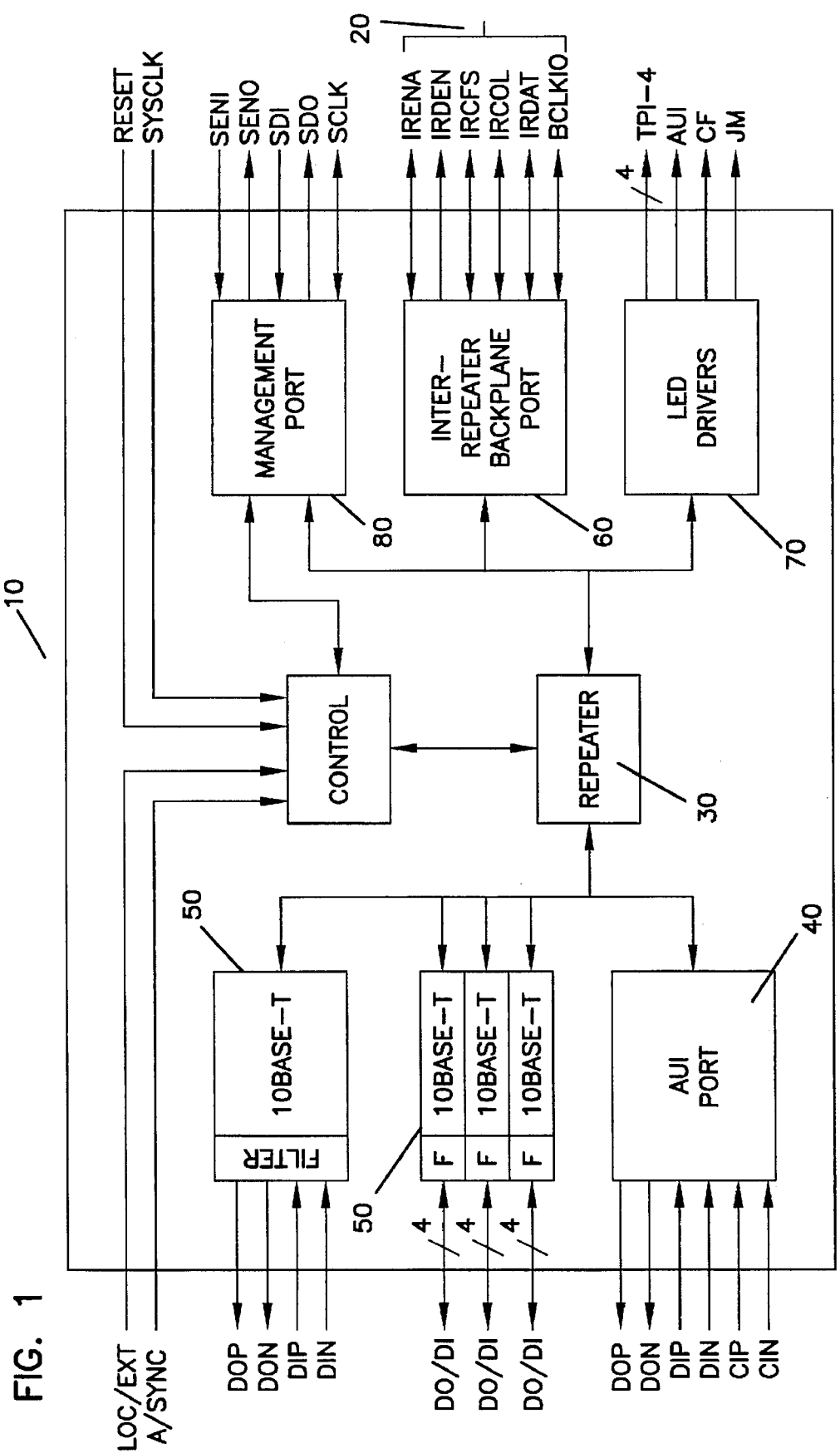
FIG. 1 is a system diagram of an exemplary repeater which can be cascaded together in accordance with the inter-repeater backplane of the present invention.

For a better understanding of the present invention, FIG. 1 illustrates an exemplary integrated hub repeater 10 for 10Base-T networks which may be combined via an inter-repeater backplane 20 according to the present invention. Typically, repeaters include a global repeater state machine, several timers and counters and a timing recovery circuit 30, and a FIFO for performing rate adaptation between transmit and receive clocks. The repeater may also include at least one Attachment Unit Interface (AUI) port 40 and a plurality of 10Base-T transceiver ports 50. AUI ports 40 are utilized to connect the repeater to other external transceivers (e.g., 10Base-2, 10Base-5, 10Base-T, or FOIRL) or to a drop cable.

Repeaters may be connected to an inter-repeater backplane by way of an inter-repeater backplane expansion port 60. The inter-repeater backplane expansion port 60 facilitates the interconnection of a large number of 10Base-T ports 50 into an integrated single repeater hub. Further, LED's may be connected to the repeater unit to indicate status of the repeater and may be driven by LED drivers 70. Finally, a network management port 80 may be provided to facilitate network management for both a Media Access Controller (MAC) layer and a physical layer according to the specifications of IEEE Std. 802.

Figure 2:
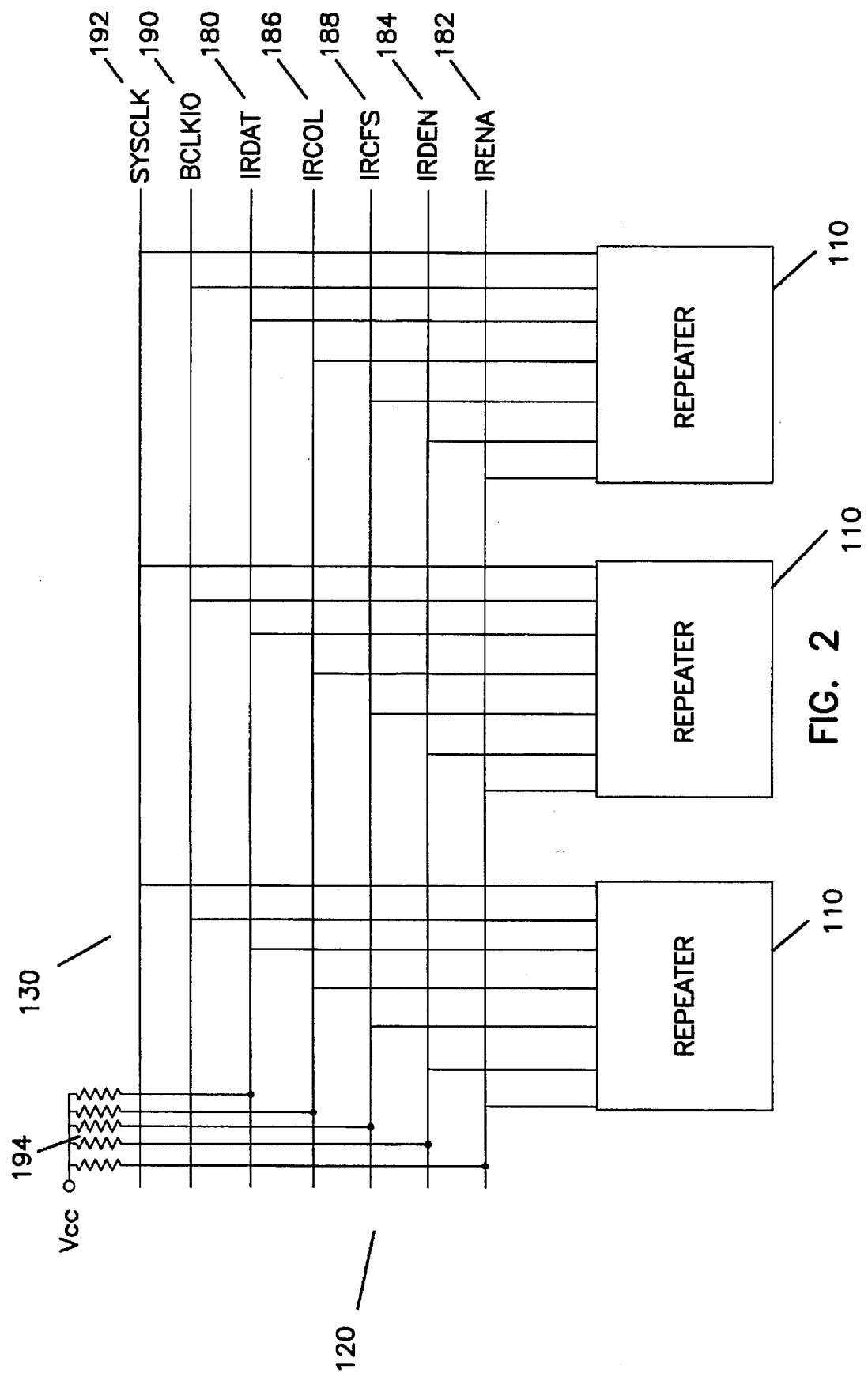
FIG. 2 is a block diagram of repeaters integrated into a single hub via the inter-repeater backplane.

FIG. 2 illustrates several multi-port repeaters 110 connected together to link several 10Base-T ports together via the inter-repeater backplane 120 to form a single hub 130. The inter-repeater backplane 120 provides the communication medium between each repeater 110. By way of collision signaling on the inter-repeater backplane, all connected repeaters share collision parameters, thereby acting as a single large repeater.

The inter-repeater backplane accommodates seven signals, i.e. IRDAT 180, IRENA 182, IRDEN 184, IRCOL 186, IRCFS 188, BCLKIO 190 and SYSCLK 192. IRDAT 180 is the inter-repeater backplane data path which allows the passage of data between multiple repeaters 110 on the inter-repeater backplane 120. IRENA 182 is the inter-repeater backplane enable which allows individual repeaters 110 to take control of the inter-repeater backplane data bus 180. IRDEN 184 is the inter-repeater backplane driver enable which is used to enable external bus drivers which may be required in synchronous systems with large backplanes. IRDEN 184 is an active low signal which is maintained for the duration of the data transmission.

BCLKIO 190 is the inter-repeater backplane clock. The backplane clock 190 is used to synchronize multiple repeaters 110 on the inter-repeater backplane 120. In the asynchronous mode, BCLKIO 190 is supplied only when a repeater 110 is outputting data to the bus 120. Each repeater 110 outputs its internally recovered clock when it takes control of the bus 120. Other repeaters 110 on the backplane 120 then rate adapt with a FIFO (to BCLKIO 190) for the duration of the transmission. In synchronous mode, BCLKIO 190 must be supplied to all repeaters 110 from a common external source.

SYSCLK 192 is the system clock. For both synchronous and asynchronous mode, the system clock is distributed over the backplane from a central source. In synchronous mode, BCLKIO 190 is derived from SYSCLK 192.

The inter-repeater backplane 120, according to the present invention, provides collision signalling via a mixed signal state machine interconnect. Collision signaling, according to the present invention utilizes both analog and digital circuitry to convey state machine information to adjacent chips. The collision signaling is handled by IRCOL 186 and IRCFS 188. IRCOL 186 signals collisions and IRCFS 188 is the inter-repeater backplane collision force sense. IRCOL 186 is a digital open-drain whereas IRCFS 188 is an analog/digital signal.

All backplane signals except for BCLKIO 190 and SYSCLK 192 are open drain and therefore require pullup resistors 194. Open drain drivers are required to prevent contention since multiple repeaters will simultaneously be driving, in collision, IRCOL 186 and IRCFS 188, or attempting to drive IRDAT 180, IRENA 182, IRDEN 184 when two repeaters receive data at exactly the same time. All hubs 130 in the system monitor the bidirectional pin, IRCFS 188 and IRCOL 186 for transmit collision, PORTM ("one port left state") and IRENA 182 for PORTN (the specific port of a hub receiving data) information. The hub that receives a packet will control the backplane signalling.

The repeater receiving data will pull IRENA 182 low. In addition, that repeater will pull current (approximately 7 milliamps) through the external pullup resistor. This will create a voltage at IRCFS 188 which is approximately one-half of $V_{cc}$. The voltage which is sensed (or scanned) at IRCFS 188 is one-third of $V_{cc}$. If two repeaters receive data at the same time, they will both pull IRENA 182 low and will both pull current through IRCFS 188. When this occurs, IRCFS 188 will be below the threshold and transmit collision is entered. If only one repeater is receiving data, IRENA 182 lets other repeaters in the hub know PORTN has been assigned and deters control of the backplane.

Figure 3:
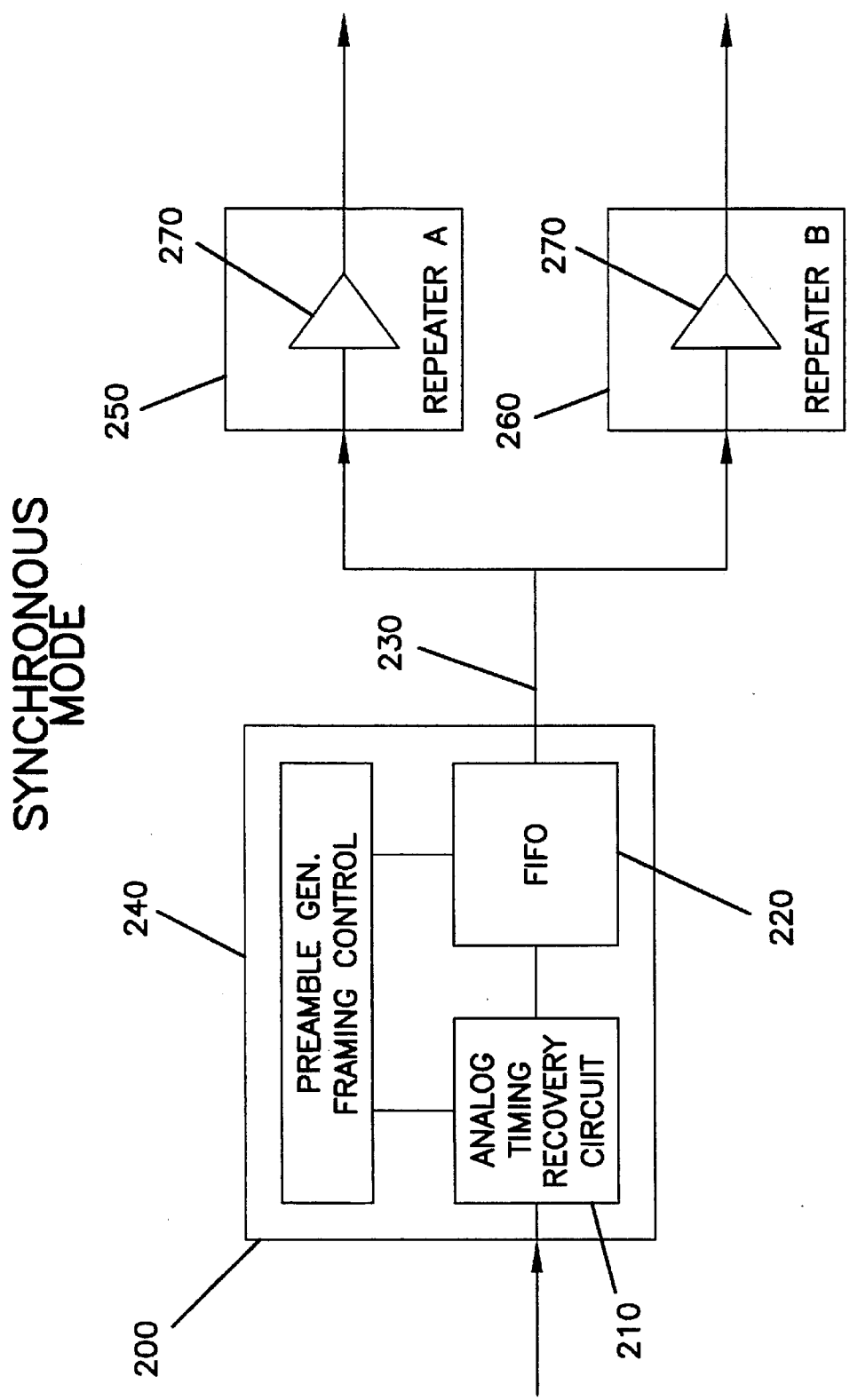
FIG. 3 is a block diagram of repeaters transmitting data synchronously via the inter-repeater backplane.

The synchronous and asynchronous modes of data transmission are described in further detail with reference to FIG. 3 and 4. FIG. 3 illustrates the synchronous mode of operation. In synchronous mode, a system 10 MHz and 20 MHz clock are used for all of the repeaters in the hub. Data passing across the Inter-Repeater Backplane is synchronous to these two clocks. The common external source provides a common 10 MHz clock (BCLKIO). A 20 MHz system clock can be derived therefrom using, for example, a phase locked loop. The 10 MHz inter-repeater backplane clock must be synchronous with the 20 MHz system clock. The 10 MHz inter-repeater backplane clock may be derived from the 20 MHz clock using a divide-by-two circuit. The repeater 200 receiving the data packet recovers the data via its timing recovery circuitry 210. The data is passed to a FIFO 220 where it is retimed to the system 10 MHz clock using a receive side FIFO and passed onto the backplane 230. This repeater 200 is also responsible for regenerating the preamble on the receive side and controlling the data framing signals 240 on the backplane 230. Both the 10 MHz inter-repeater backplane clock and the retimed data are then transmitted over the backplane 230. Other repeaters 250, 260 on the backplane 230 then repeat 270 the data received over the backplane 230 without additional retiming. For illustration purposes, only two additional repeaters 250, 260 are shown. However, it is to be understood that additional repeaters could be attached to the backplane in accordance with the invention.

Figure 4:
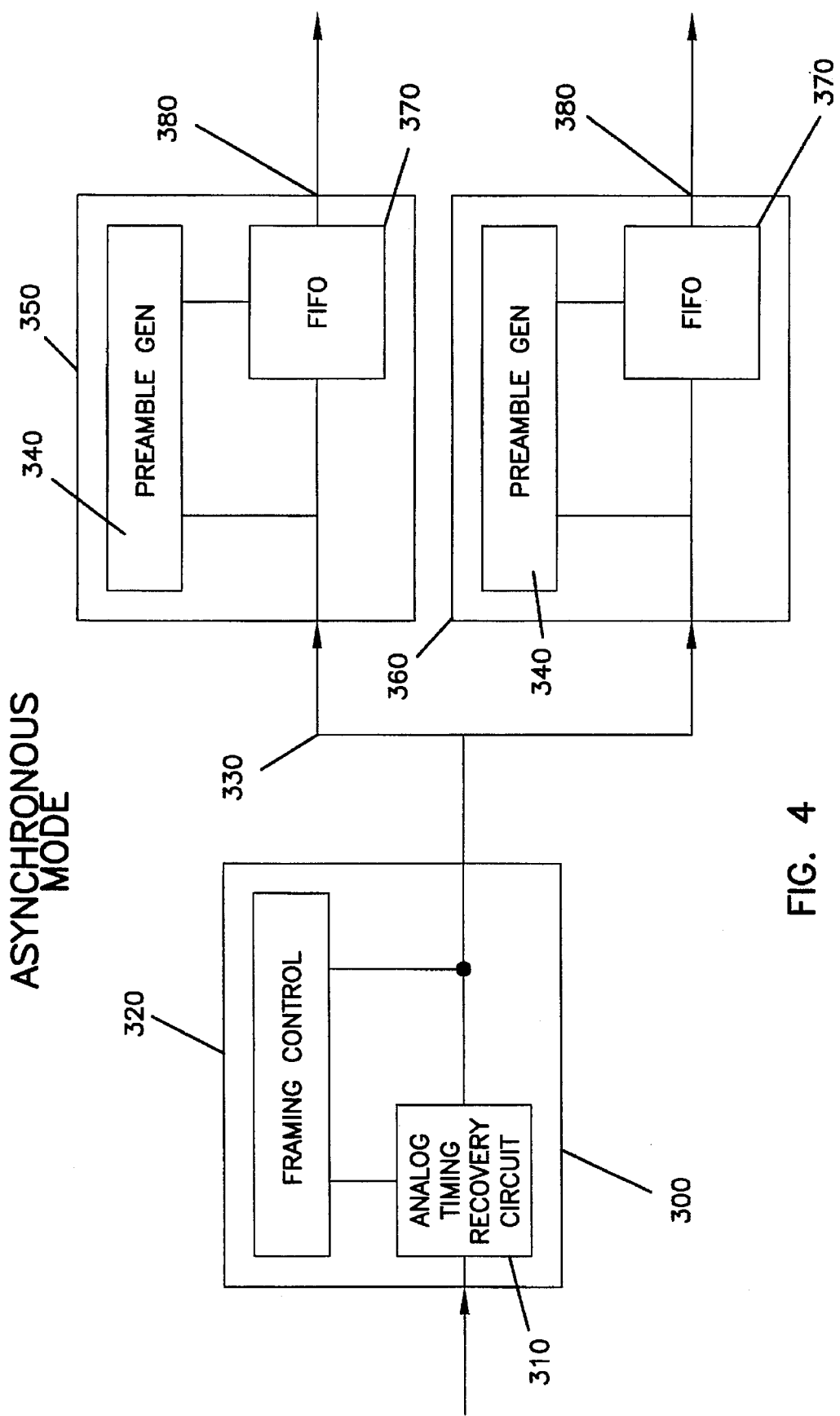
FIG. 4 is a block diagram of repeaters transmitting data asynchronously via the inter-repeater backplane.

The asynchronous mode of transmission is illustrated in FIG. 4. In asynchronous mode an external 10 MHz inter-repeater backplane clock is not required. Instead a master clock is provided for the system, each chip in the system, or each card comprising the system. For example, each repeater could run off its own clock source. Thus, the repeaters run independently until one takes control of the inter-repeater backplane. The repeater 300 receiving the data packet recovers the data via its timing recovery circuitry 310. This repeater 300 is also responsible for controlling the data framing signals 320 on the backplane 330. After recovering the data and establishing the data framing the data and the recovered clock are passed onto the inter-repeater backplane 330. All other repeaters 350, 360 synchronize to that clock for the duration of the transmission. In the asynchronous mode, preamble regeneration 340 takes place on the transmit side. Each repeater 350, 360 on the inter-repeater backplane regenerates the preamble 340, and upon detection of start of frame retimes the backplane data via its transmit side FIFO 370 and clocks the data out with its internal 10 MHz clock to each of its ports 380.

Figure 5:
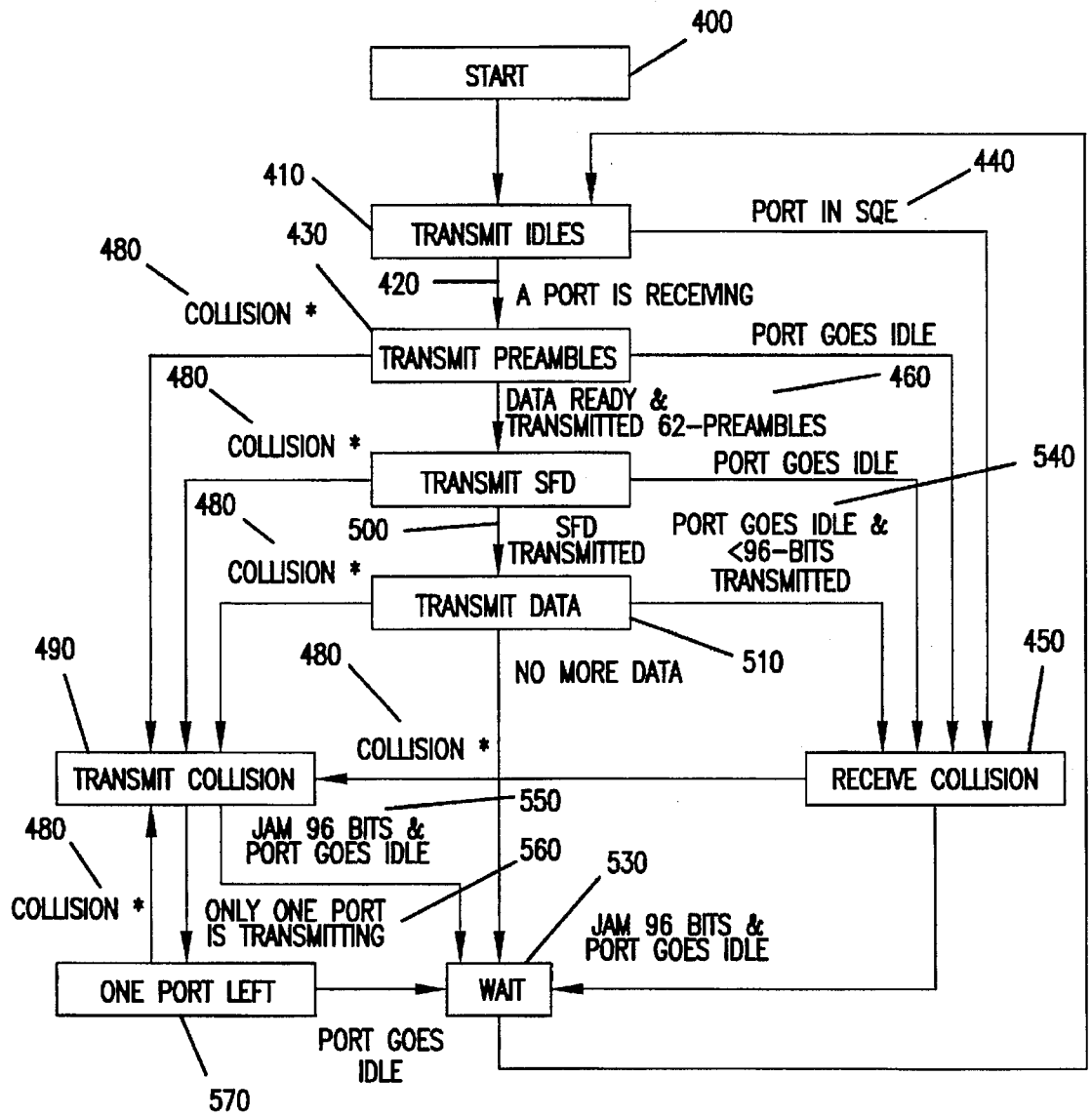
FIG. 5 is a state diagram illustrating the repeater state machine.
Figure 6:
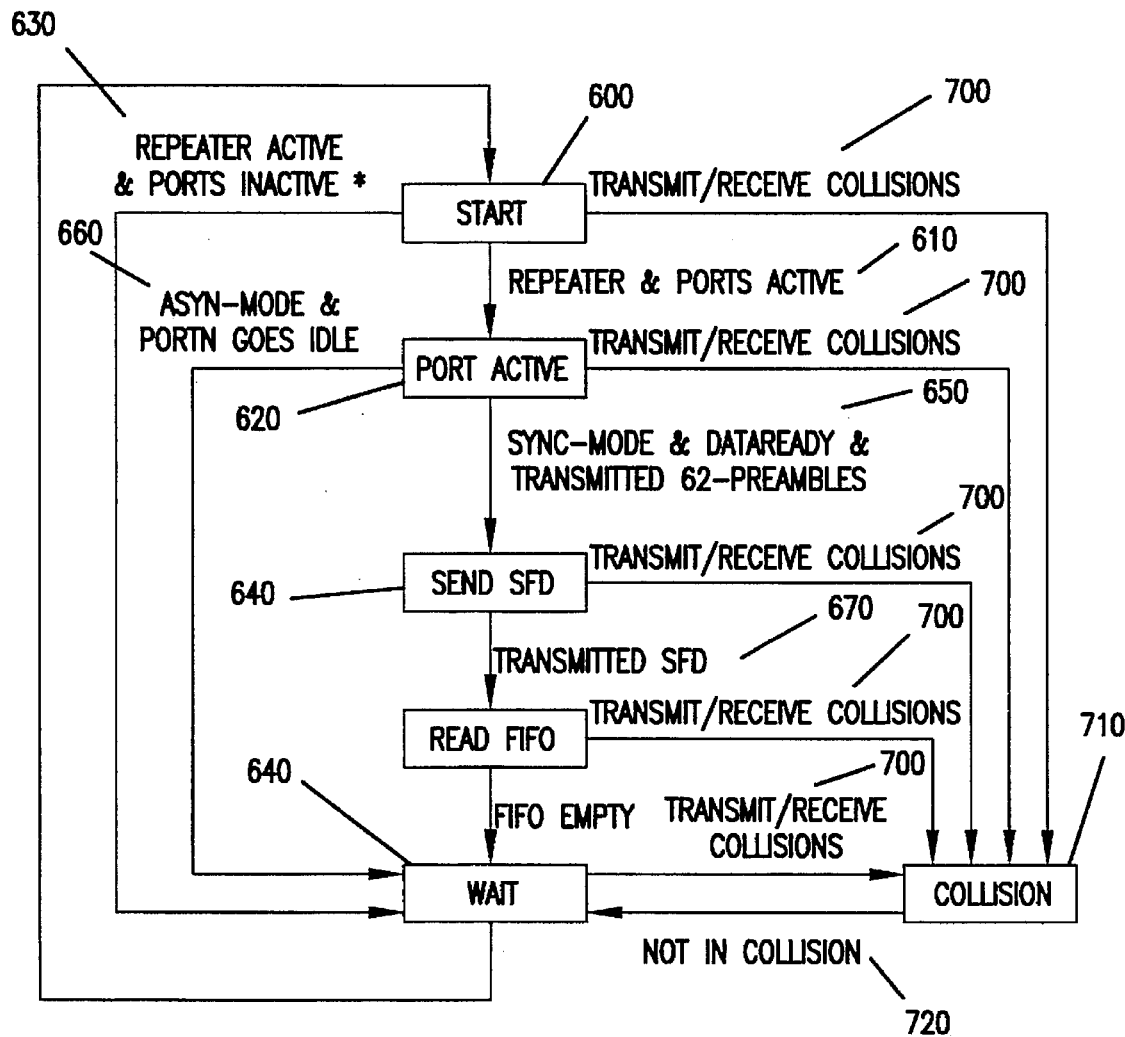
FIG. 6 is a state diagram illustrating the backplane state machine.

Two state machines are utilized to implement both the synchronous and asynchronous backplane control scheme. The state diagram of the Repeater State Machine is shown in FIG. 5. The state diagram for the inter-repeater state machine is shown in FIG. 6. Together they comply with the 802.3 Repeater State Machine requirements established by Section 9 of the IEEE 802.3 Standard. The state machines allows repeaters to transmit data in either synchronous or asynchronous modes. These state machines comply with 802.3 IEEE Standards and facilitate both synchronous and asynchronous data transmission without requiring an external bus and a bus orbiter.

The repeater state machine will be described with reference to FIG. 5. Repeaters enter an idle state upon being energized. When a port on a repeater receives data, the repeater begins to transmit a preamble pattern unless a port on that repeater is already in collision. In the latter case, the repeater transitions to the receive collision state. When the data is ready to be transmitted and 62 preambles have been transmitted, the machine transitions to the transmit SFD (start of frame) state. However, if a port goes idle during the transmission of the preambles, the repeater transitions to the receive collision state. Whenever a port receives and transmits at the same time, then the transmit collision state is entered.

Once the SFD is transmitted, the repeater transitions to the transmit data state. When all of the data has been transmitted, the repeater transitions to the wait state before finally recycling to the transmit idle state. However, if a port goes idle on the repeater and less than 96 bits were transmitted, the repeater transitions to the receive collision state.

As described above, whenever a collision is detected, the repeater transitions to the transmit collision state. If no data are being received on the repeater ports after the repeater transmits a Jam of 96 bits to all of the ports to which it is connected, the port goes idle and the repeater state machine transitions to the wait state. If only one port is receiving data when the repeater is in the transmit collision state after jamming for 96 bits, the repeater enters the one port left state. If a collision is detected, the repeater returns to the transmit collision state.

The backplane state machine will be described with reference to FIG. 6. The backplane is initialized in the start state. When the repeater and ports become active, the backplane transitions to the port active state. If the repeater is active but the ports remain inactive, the backplane transitions from the start state to the wait state instead.

The backplane transitions from the port active state to the send SFD state after 62 preambles are sent if the repeater is set for synchronous data transmission and the data is ready to be transmitted. However, if the repeater is set for asynchronous mode of data transmission and PORTN goes idle, the repeater transitions to the wait state.

Once the SFD signal has been transmitted, the backplane transitions to the read FIFO state. Once the FIFO buffer is empty, the backplane transitions to the wait state. Thereafter the backplane recycles to the start state. If another repeater on the backplane is receiving data, the backplane transitions from the state therein to the collision state. When only one or no repeater on the backplane is receiving data, the backplane transitions from the collision state to the wait state.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An inter-repeater backplane for connecting a plurality of repeaters that receive data packets, recover the data therein, and repeat the recovered data over the backplane, the inter-repeater backplane comprising:

an inter-repeater bus of electrical signal conductors coupling a plurality of repeaters for transmitting data therebetween, wherein the bus of electrical signal conductors comprises a bus activity signal conductor for providing distributed arbitration, wherein collisions are communicated using a single, three-level analog signal;

a system clock, coupled to the bus, for providing master timing signals common to the plurality of repeaters;

means, coupled to the bus, for selecting a mode of data transmission; and transmission means, coupled to the selection means, for transmitting data using a first synchronous data transmission mode wherein a first repeater receives and recovers data, the received and recovered data being retransmitted by a second repeater synchronously with respect to the system clock second repeater for later retransmission of the data, the second repeater retransmitting the data without retiming and a second and a second asynchronous data transmission mode wherein data received and recovered by the first repeater is retransmitted by a second repeater asynchronously with respect to the system clock;

wherein the bus activity signal conductor allows the selected mode of data retransmission to occur between the plurality of repeaters via the distributed arbitration communicated by the single, three-level analog signal.

2. The inter-repeater backplane as recited in claim 1 further comprising means for regenerating a preamble for the recovered data.

3. The inter-repeater backplane as recited in claim 2 further comprising means for controlling the data framing.

4. The inter-repeater backplane as recited in claim 1 further comprising:

a plurality of independent repeater clock signals, each of the plurality of independent repeater clock signals being associated with one of the plurality of repeaters, for providing a clock signal asynchronous to the system clock for the retransmission by the second repeater of the received and recovered data according to the second asynchronous data transmission mode.

5. An inter-repeater backplane for connecting a plurality of repeaters, comprising:

an inter-repeater bus of electrical signal conductors coupling a plurality of repeaters for transmitting data therebetween, wherein the bus comprises an activity signal for providing distributed arbitration, wherein collisions are communicated using a single, three-level analog signal;

a system clock, coupled to the bus, for providing master timing signals common to the plurality of repeaters;

means for recovering data from a data packet received by a first repeater of the plurality of repeaters;

means for regenerating a preamble for the recovered data;

means for framing the recovered data;

means, coupled to the bus, for selecting a mode of data transmission, a first mode being synchronous data transmission wherein a first repeater receives and recovers data, the received and recovered data being transmitted over the bus synchronously with respect to the system clock and a second mode being asynchronous data transmission wherein the data received and recovered by the first repeater is retransmitted by a second repeater asynchronously with respect to the system clock, wherein the bus activity signal allows the selected mode of data retransmission to occur between the plurality of repeaters via the distributed arbitration communicated by the single, three-level analog signal.

6. The inter-repeater backplane as recited in claim 5 further comprising:

a plurality of independent repeater clock signals, each of the plurality of independent repeater clock signals being associated with one of the plurality of repeaters, for providing a clock signal asynchronous to the system clock for the retransmission by the second repeater of the received and recovered data according to the second asynchronous data transmission mode.

7. An inter-repeater backplane for connecting a plurality of repeaters, comprising:

a bus of electrical signal conductors coupled between the repeaters for transmitting data therebetween;

a first system clock, coupled to the bus, for providing a first timing signal for the data transmitted over the bus;

means for selecting the mode of data transmission, a first mode being synchronous data transmission and a second mode being asynchronous data transmission;

means for recovering data by a first repeater, the data being recovered from a first received data packet;

means for transmitting the recovered data to a second repeater synchronously with respect to the first system clock in response to the first mode of data transmission being selected, the means for transmitting data synchronously further comprises means coupled to the bus for retiming the recovered data to the first system clock and means for transmitting the retimed data over the bus to the second repeater, the second repeater retransmitting the retimed data synchronously with the first system clock; and means for transmitting the recovered data asynchronously with respect to the first system clock in response to the second mode being selected, the means for transmitting data asynchronously further comprises an independent repeater clock a synchronous to the system clock, associated with each of the plurality of repeaters, for retransmitting the retimed data according to the independent repeater clock.

8. The inter-repeater backplane as recited in claim 7 further comprising means for regenerating a preamble for the data.

9. The inter-repeater backplane as recited in claim 7 further comprising means for controlling the framing of the recovered and repeated data.

10. A method for transmitting data between a plurality of repeaters, the method comprising the steps:

selecting a data transmission mode of a plurality of repeaters for transmitting data over a inter-repeater backplane, a first mode being synchronous data transmission and a second mode being asynchronous data transmission;

providing a system timing signal;

providing a plurality of independent repeater clock signals, each of the plurality of independent repeater clock signals being associated with one of the plurality of repeaters, and each of the independent repeater clock signals being asynchronous to the system timing signal;

recovering data from a data packet received by a first of the plurality of repeaters;

transmitting the recovered data synchronously with respect to the system timing signal over the inter-repeater backplane from the first repeater to a second repeater for retransmission in response to the first mode of data transmission being selected, the data being repeated by the second repeater sychronously with the first system clock; and transmitting the recovered data asynchronously with respect to the system timing signal over the inter-repeater backplane from the first repeater to the second repeater for retransmission in response to the second mode of data transmission being selected, the second repeater retiming the data to the independent repeater clock signal associated with the second repeater before retransmission by the second repeater.

11. A method for transmitting data between a plurality of repeaters over an inter-repeater backplane bus, the method comprising the steps:

selecting the mode of data transmission, a first mode being synchronous data transmission and a second mode being asynchronous data transmission;

recovering data from a data packet received by a first of the plurality of repeaters;

regenerating a preamble for the recovered data;

framing the recovered data;

providing a system timing signal;

transmitting the recovered data synchronously with respect to the system timing signal from the first repeater to a second repeater for retransmission in response to the first mode of data transmission being selected, the data being retransmitted by the second repeater synchronously with the system timing signal; and transmitting the recovered data from the first repeater to the second repeater for retransmission by the second repeater according to an independent repeater clock in response to the second mode of data transmission being selected, the second repeater retiming the data to the independent repeater clock before retransmission by the second repeater.

12. A method for transmitting data between a plurality of repeaters, the method comprising the steps:

selecting the mode of data transmission, a first mode being synchronous data transmission and a second mode being asynchronous data transmission;

recovering data from a data packet received by a first of the plurality of repeaters;

regenerating a preamble for the recovered data;

framing the recovered data;

providing a first system timing signal, the first system timing signal being shared by the plurality of repeaters;

providing a second independent timing signal to each of the repeaters, the second independent timing signal being asynchronous to the first system timing signal;

transmitting the data synchronously with respect to the first system timing signal in response to the first mode of data transmission being selected, the synchronous data transmission requiring the retiming of the recovered data to the first system timing signal and transmitting the retimed data over the bus from the first repeater to a second repeater, the transmitted retimed data being retransmitted by the second repeater synchronously with respect to the first system timing signal; and transmitting the data asynchronously with respect to the first system timing signal in response to the second mode of data transmission being selected, the asynchronous data transmission requiring the retiming of the recovered data to the second independent timing signal before retransmission by the second repeater.

* * * * *